United States Patent Office 3,012,825
Patented Dec. 12, 1961

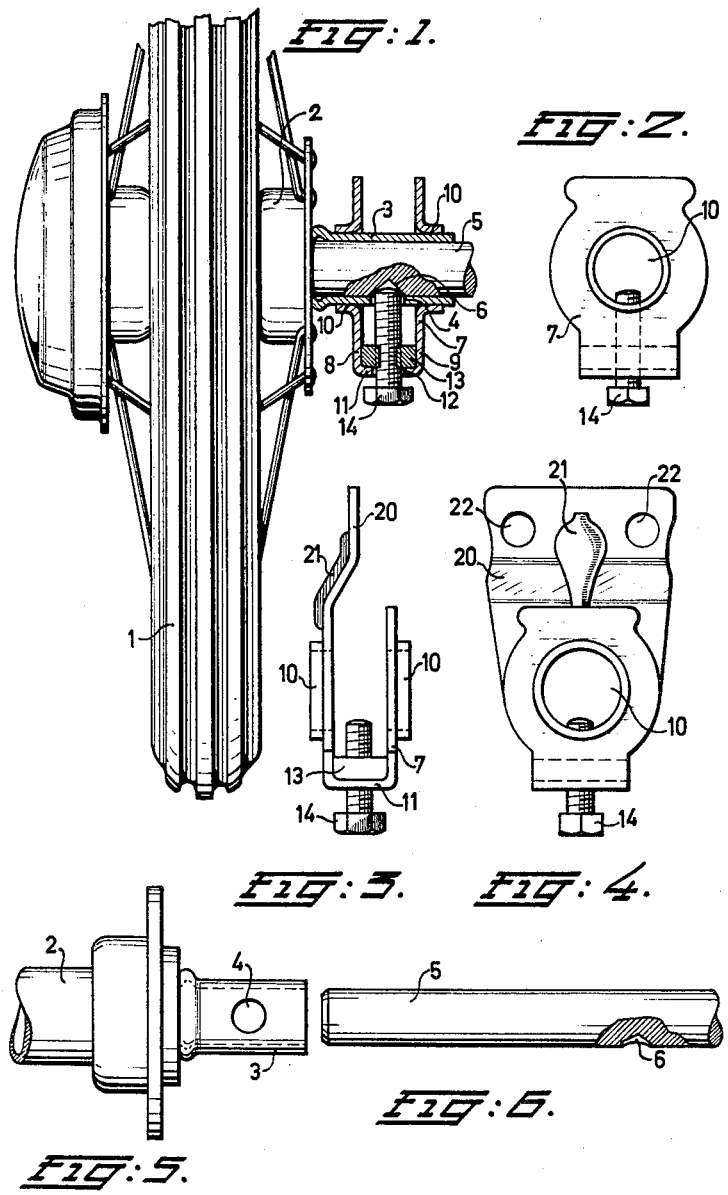

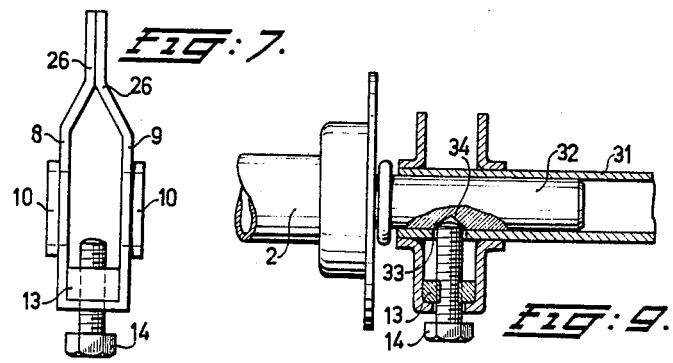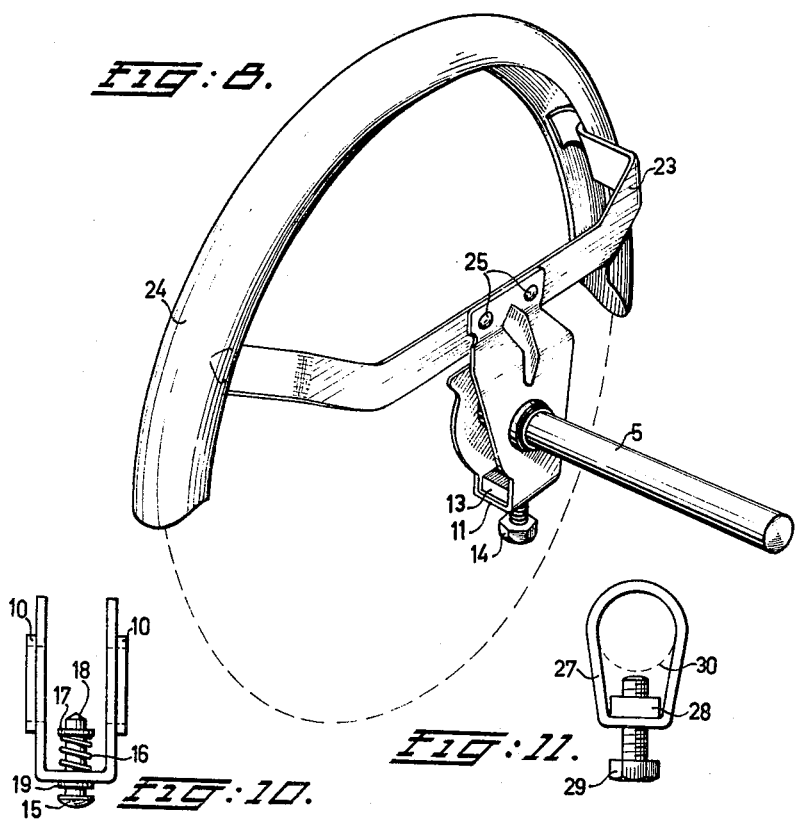

3,012,825
METHOD FOR THE ATTACHMENT OF A WHEEL AND FIXING MEANS TO BE USED THEREWITH
Carolus Hendrikus Willebrordus Bullens, Eindhovenseweg 71, Best, Netherlands
Filed Nov. 3, 1959, Ser. No. 850,574
Claims priority, application Germany Nov. 8, 1958
4 Claims. (Cl. 301—132)

The invention relates to techniques for securing a stump of a wheel axle to a fixed bearing axle and to fixing means to be utilized therewith.

The known ways of securing a wheel, particularly a perambulator wheel, have the disadvantage that the attachment has to be effected in a rather complicated manner whereby special tools have to be used. Moreover, the known means for such an attachment often require an unnecessarily large amount of material and installation time. Further, the attachment can generally only be carried out by craftsmen.

It is an object of the invention to obviate these disadvantages and to provide improved techniques for mounting wheel axle stumps and means to effect these techniques whereby the mounting of the axle stump and consequently of the wheel is obtained by the displacement of only one fixing means.

For that purpose, the invention is characterized in that an axle stump engages a bearing axle in such a way that an aperture in the axle stump coincides with a recess in the bearing axle, a fixing means grasping the bearing axle and the axle stump telescoped one into the other being provided with an attachment means, which can be moved through the recesses in the axle stump and the bearing axle and fixed under radial pressure, irremovably connecting the axle stump, the bearing axle and the fixing means one with respect to another. A very simple and efficient fixing means according to the invention is characterized in that it is annular while the attachment means is led through the ring wall. Another embodiment of the invention according to which the fixing means is made by stamping and bending sheet is characterized in that the parallel legs of a substantially U-shaped, bent sheet are provided with coaxial holes, while the attachment means is led through the part connecting the parallel legs. The holes have a diameter corresponding substantially with the outer diameter of the axle stump and bearing axle telescoped one into the other. A very advantageous embodiment of the U-shaped fixing means according to the invention is characterized in that at least one of the parallel legs is elongated in order to form thereby the bearer for a mud guard support. This embodiment has the advantage that the mud guard is brought into the right position with respect to the wheel in a single operation.

The invention is clarified with the aid of the annexed drawing in which:

FIGURE 1 shows in front view, partially broken away, a wheel according to the invention, the said wheel being secured to a bearing axle and the attachment of the axle being shown in longitudinal section.

FIGURE 2 shows a side elevation of the fixing means represented in FIG. 1.

FIGS. 3 and 4 show a front view and a side elevation, respectively, of an embodiment of the fixing means according to the invention, one leg of the said means being elongated.

FIGURE 5 shows a detail of a boss of the wheel with a tubular axle stump in side elevation.

FIGURE 6 shows in side elevation, partially in section, a part of the fixed bearing axle.

FIGURE 7 shows a modified embodiment of the fixing means according to FIG. 3, the said means, however, having two elongated legs one secured to the other.

FIGURE 8 shows the attachment means according to FIGS. 3 and 4 and the mud guard support and mud guard secured thereto and the axle stump and fixed bearing axle, the wheel being diagrammatically indicated.

FIGURE 9 shows, partially in cross section, a detail of a modified embodiment.

FIGURE 10 shows a fixing means according to FIGS. 1 and 2, the attachment means being a resilient pin.

FIGURE 11 shows a side elevation of a modified embodiment of the fixing means.

In the drawing, a tire is indicated by 1, the boss of the wheel is indicated by 2, while 3 is the axle stump protruding outwardly of the boss 2 and which is rotatably supported in bearings in the boss 2. The axle stump 3 is provided with an aperture 4. In the axle stump a fixed bearing axle 5 provided with a recess 6 can be disposed, the said bearing axle 5 being telescoped into the axle stump 3 in such manner that the aperture 4 and the recess 6 coincide. In order to mount the wheel, a fixing means 7, substantially consisting of an U-shaped sheet, the legs 8 and 9 of which are provided with coaxial holes 10 in which the axle stump can be accommodated, is pushed over the axle stump 3. There is an aperture 12 disposed in the part 11 connecting the parallel legs 8 and 9, a nut 13 being pinched at the inner side of the legs while a bolt 14 is provided to be screwed into the said nut. Thereupon the axle stump 3 with the fixing means 7 is pushed over the fixed bearing axle 5 and the bolt 14 is tightly screwed in so as to extend through the aperture 4 into the recess 6, the fixing means 7 with the holes 10 pushing the axis stump 3 rigidly against the bearing axle 5, whereby the axle stump 3 together with the boss 2 and the fixing means 7 are fixed upon the bearing axle 5 in the axial as well as in the radial and tangential directions. In another embodiment according to FIG. 10, the bolt 14 and the nut 13 in the fixing means 7 may be replaced by a pin 15, which under the influence of a spring 16 is pressed in the direction of the axis of the holes 10, whereby the spring on the one hand exercises pressure on the connecting part 11 and on the other hand exercises pressure on a shoulder 17 rigidly disposed on the pin 15. The free end 18 over the shoulder 16 of the pin 15 penetrates into the apertures 4 and 6 to realize the desired attachment.

The pin 15 at the outer side of the connecting part 11 is provided with a shoulder 19 limiting the inward movement of the pin.

FIGS. 3 and 4 represent an advantageous embodiment of the fixing means 7.

The fixing means corresponds substantially with that according to the FIGS. 1 and 2, except that the leg 8 is elongated by a part 20, which moreover is bent towards the center longitudinal plane of the fixing means and provided with a ridge 21 for reinforcement. The part 20 is provided with two holes 22 for securing thereto a mud guard support 23, as shown in FIG. 8, which in turn is fixedly connected to a mud guard 24. To that end, rivets 25 are used. By proper dimensioning and shaping of the parts 20, 23 and 24, the attachment of the wheel to the bearing axle 5 and the proper positioning of the mud guard 24 with respect to the wheel is effected in such a way that a single bolt 14 is tightened or a resilient pin or cam 15 is made to catch in the apertures 4 and 6. In the event of greater wheel dimensions and/or, larger mud guards it is possible as shown in FIG. 7 to elongate both legs 8, 9 by parts 26, which are bent one towards the other and joined one to the other in the center longitudinal plane of the fixing means. In the same way a mud guard support 23 with a mud guard 24 can be secured to these parts 26.

The fixing means may also have the shape shown in FIG. 11 wherein it consists of a ringshaped brace 27 accommodating a nut 28 with a bolt 29 extending through an aperture in the brace 27 and threadably engaged in the nut 28. The circumference of the axle stump is indicated by a dotted line 30. The ring-shaped brace 27 can also be provided with a support for a mud guard support and with a mud guard, as already described in relation to FIG. 8.

It is not necessary in relation to the invention that the axle stump be tubular and the fixed bearing axle solid. The fixed bearing axle may instead be tubular and the axle stump may be solid or tubular, the axle stump extending within the bearing axle. An example of such a construction is shown in FIG. 9, wherein 31 is the fixed bearing axle, 32 is the solid axle stump telescoped into the bearing axle 31. The fixing means already described can also be applied to this construction. In FIG. 9 there is shown a fixing means 7 corresponding with that of FIG. 2, the bolt 14 being supported for threadably engaging the nut 13 protruding through the hole 33 of the fixed bearing axle 31 in the recess 34 of the solid axle stump 32. In this construction, too, the legs of the fixing means may be elongated for the attachment of the mud guard support.

By the construction according to the invention, the mounting of a wheel is very much simplified, while in addition the possibility is created to secure at the same time the mud guard. Instead of a bolt or a resilient pin for the purpose of fixing one with respect to another the bearing axle, axle stump, fixing means and mud guard, other known fixing means for instance an eccentric can be used within the scope of the invention.

What is claimed is:

1. Apparatus for mounting a wheel comprising an axle stump means on said wheel, a bearing axle means telescopically engaging said stump means, said stump and bearing axle means having alignable openings and a fixing device on one of said means, said fixing device including spaced annular flanges surrounding said one means and a member insertable through said openings for preventing relative axial displacement between said means, said member being operatively coupled to said annular flanges to urge the same radially against said one means to lock said means together.

2. Apparatus as claimed in claim 1 wherein said device further comprises an annular leg on each of said flanges and substantially perpendicular thereto, a bridging part connecting said legs, said bridging part being provided with an opening for accommodating said member.

3. Apparatus as claimed in claim 1 wherein said fixing device includes a threaded element threadably engaged by said member.

4. Apparatus as claimed in claim 2 wherein said flanges are of unequal length comprising a mud guard support on the longer flange, said longer flange and mud guard support cooperatively defining a support.

References Cited in the file of this patent
UNITED STATES PATENTS

| | | |
|---|---|---|
| 672,098 | Fahnestock | Apr. 16, 1901 |
| 894,884 | Hallowell | Aug. 4, 1908 |
| 993,466 | Spohrer | May 30, 1911 |
| 1,249,676 | Seaman | Dec. 11, 1917 |
| 1,802,552 | Corcoran | Apr. 28, 1931 |
| 2,739,830 | Firth | Mar. 27, 1956 |